United States Patent [19]

Doe et al.

[11] 4,037,733
[45] July 26, 1977

[54] BAR HOLDER ARRANGEMENT FOR BAR STOCK MATERIAL TO BE FED TO A MACHINE TOOL

[75] Inventors: Ewart H. Doe, Houghton, near Stockbridge; William J. Linforth, Chandlers Ford, both of England

[73] Assignee: Hagenuk Vormals Neufeldt and Kuhnke G.m.b.H., Kiel, Germany

[21] Appl. No.: 600,116

[22] Filed: July 29, 1975

[51] Int. Cl.² .............................................. B23Q 5/22
[52] U.S. Cl. ........................................ 214/1.5; 82/2.5
[58] Field of Search ................. 214/1.1, 1.2, 1.3, 1.4, 214/1 P, 2.5, 1.5; 294/86.12, 90, 91, 106; 269/237, 126, 57, 107, 153, 218, 238, 239, 157; 82/2.5, 2.7

[56] References Cited

U.S. PATENT DOCUMENTS

| | | | |
|---|---|---|---|
| 1,174,361 | 3/1916 | Simmons et al. | 294/90 |
| 1,295,439 | 2/1919 | Coveney | 294/90 |
| 3,328,052 | 6/1967 | Nilsson | 269/237 X |
| 3,802,689 | 4/1974 | Doe | 269/57 |
| 3,941,256 | 3/1976 | Doe et al. | 214/1.4 |

FOREIGN PATENT DOCUMENTS

| | | | |
|---|---|---|---|
| 11,600 | 1892 | United Kingdom | 214/1.1 |
| 973,065 | 10/1964 | United Kingdom | 294/86.12 |

*Primary Examiner*—Evon C. Blunk
*Assistant Examiner*—Joseph E. Valenza
*Attorney, Agent, or Firm*—Lowe, King, Price & Markva

[57] ABSTRACT

A bar holder arrangement for holding bar stock material to be fed to a machine tool, comprising a plurality of guide members each having a semi-circular recess therein, said guide members co-operating each with another of said guide members in pairs to define a plurality of circular receiving means for bar stock material and each of said guide members being pivotably mounted about a respective axis perpendicular to the longitudinal extent of the bar holder arrangement so as to be pivotable outwardly to permit passage between the co-operating pairs of guide members of a bar feed member having a diameter greater than the diameter defined by the circular receiving means of said pairs of guide members.

8 Claims, 6 Drawing Figures

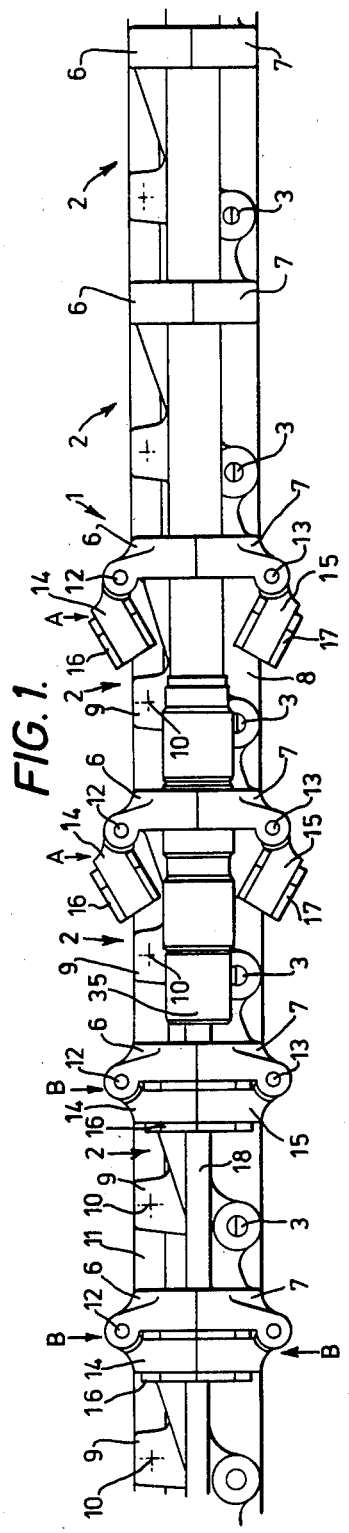
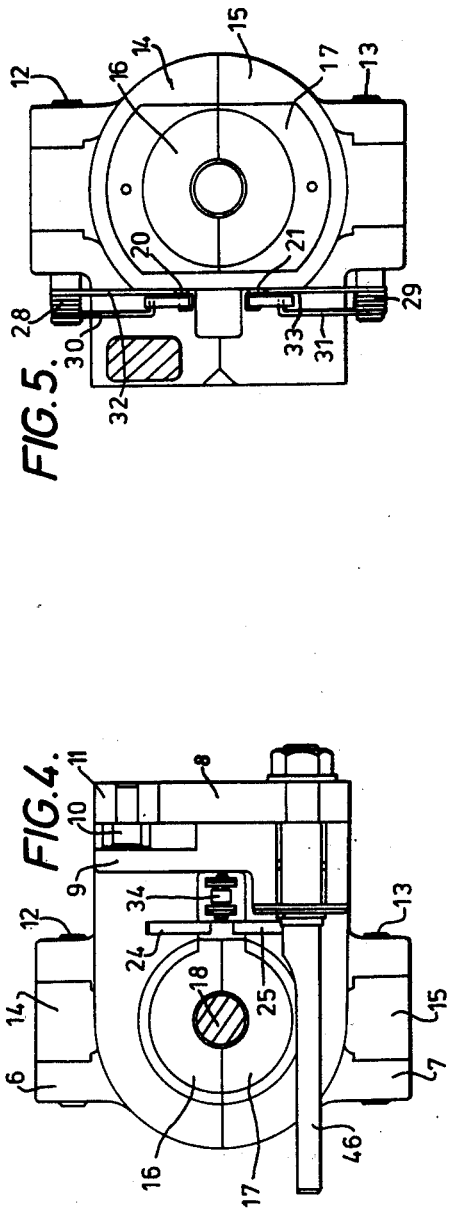

BAR HOLDER ARRANGEMENT FOR BAR STOCK MATERIAL TO BE FED TO A MACHINE TOOL

BACKGROUND OF THE INVENTION

The invention relates to a bar holder arrangement for holding bar stock material in a manner to permit feed of the bar stock material to a machine tool.

The invention is particularly applicable to a bar holder arrangement of the kind disclosed in the specification of our U.S. Pat. No. 3,802,689.

This Patent specification disclosed a bar holder arrangement for holding bar stock material to be fed to a machine tool. The arrangement comprises a frame and at least one elongated bar holder mounted in the frame. The bar holder comprises a plurality of levers each pivotably mounted on an elongated member of the bar holder. Each of the levers has at one of its ends an upstanding member having a semicircular recess therein and at the other of its ends a further upstanding member having a semicircular recess therein. The levers are disposed along the elongated member that said upstanding member of one lever co-operates with said further up standing member of the next adjacent lever to define a circular receiving means for a length of bar stock material. Pivoting means for said levers is effective to separate the upstanding member of each lever from the further upstanding member of an adjacent one of the levers to open the bar holder and enable a length of bar stock material to be moved to a position in which it is received by said circular receiving means when the levers are moved to respective positions in which the upstanding member of each of the levers abuts the further upstanding member of an adjacent one of the levers to form said circular receiving means.

The aforesaid Patent specification further discloses that the semi-circular recesses in the upstanding member and further upstanding member are provided by inserts received in said members and said further members.

In practice the inserts are changed when a change is made in the diameter of the bar stock material being machined and held in the bar holder arrangement so that the circular receiving means defined by the bar holder arrangement are each a clearance fit around the bar stock material.

Where feed means, to feed bar stock material held in the bar holder arrangement longitudinally of the bar holder arrangement, is of the kind comprising a slug, the front end of which abuts the rear end of the bar stock material rather than of the kind where the bar stock material is fed by feed means which act on a portion of the bar stock material projecting from the front end of the bar holder arrangement, difficulties arise in that the slug is normally of similar diameter to the maximum size of bar stock material which can be held in the bar holder, for example 1¾ inches diameter. Thus, the slug cannot be passed through the circular receiving means when such circular receiving means are set to hold bar stock material of smaller diameter, for example ¼ inch diameter.

SUMMARY OF THE INVENTION

According to the invention, there is provided a bar holder arrangement for holding bar stock material to be fed to a machine tool, comprising a plurality of guide members each having a semicircular recess therein. The guide members co-operate each with another of said guide members in pairs to define a plurality of circular receiving means for bar stock material and each of said guide members is pivotably mounted about a respective axis perpendicular to the longitudinal extend of the bar holder arrangement so as to be pivotable outwardly. Thus, passage is permitted between the co-operating pairs of guide members of a bar feed member having a diameter greater than the diameter defined by the circular receiving means of said pairs of guide members.

Preferably the bar holder arrangement comprises a frame and a plurality of levers each pivotably mounted on an elongated member mounted on the frame. Each of the levers has at one of its ends an upstanding member having a semicircular recess therein and at the other of its ends a further upstanding member having a semicircular recess therein. Each of said guide members is pivotably mounted for movement about its respective axis on a respective one of said upstanding members or a respective one of said further upstanding members. The levers are so disposed along the elongated member that the guide member on said upstanding member of one lever co-operates with the guide member on said further upstanding member of the next adjacent lever to define one of said circular receiving means for bar stock material. Pivoting means is provided for said levers to separate the upstanding member of each lever from the further upstanding member of an adjacent one of the levers to open the bar holder arrangement and enable a length of bar stock material to be moved to a position in which it is received by said circular receiving means when the levers are moved to respective positions in which the guide member on the upstanding member of each of the levers abuts the guide member on the further upstanding member of an adjacent one of the levers to form said circular receiving means.

Preferably means to pivot the guide members outwardly comprises a lug mounted on a drive chain for the bar feed member and effective to release catches which hold the guide members in an inward position against the force of springs which bias the guide members to an outward position. The semicircular recesses provided in said upstanding member and said further upstanding member form guide means for the bar feed member.

The invention of this application is particularly, though not exclusively, applicable to bar holder arrangements for holding bar to be fed to single spindle machine tools.

BRIEF DESCRIPTION OF DRAWINGS

The invention is diagrammatically illustrated by way of example in the accompanying drawings, in which:

FIG. 1 is an elevation of a part of a length of a bar holder arrangement according to the invention, in a closed position;

FIGS. 4 and 5 are respectively views taken in the direction of arrows IV—IV and V—V of FIG. 3.

DESCRIPTION OF SPECIFIC EMBODIMENTS

Figure 2:
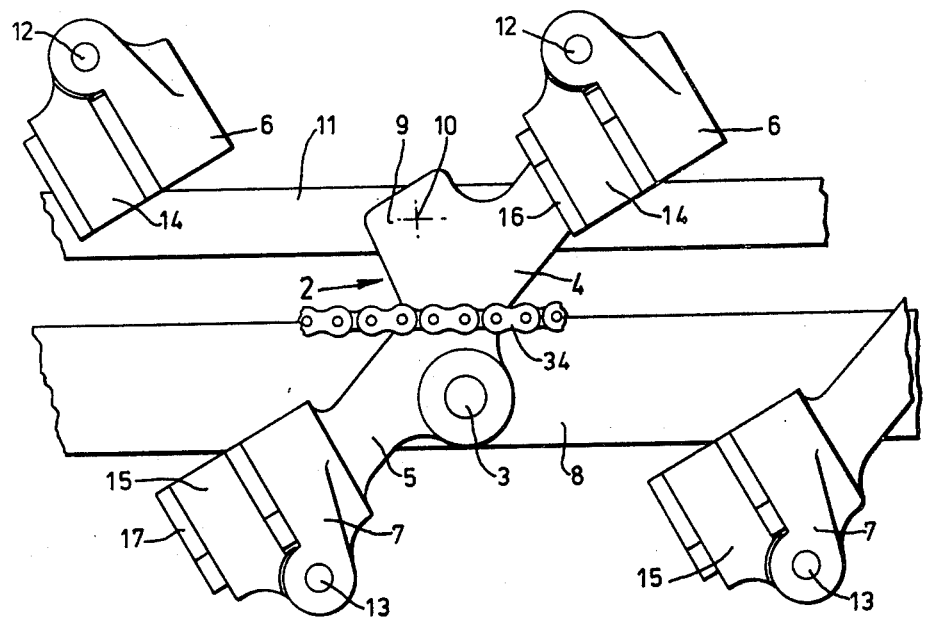
FIG. 2 is a view similar to FIG. 1 but showing a portion of the bar holder arrangement in an open position.

Referring to the drawings, a bar holder arrangement generally indicated at 1, may be, for example twelve feet in length, the portion shown in FIG. 1 representing only about the rear end third of such length, and including a plurality of levers 2 each which is pivotally mounted about a pivot 3 and has two arms 4 and 5. The shape of the levers 2 can best be seen in FIG. 2. Each arm 4 has an upstanding member 6 at its free end and each arm 5 an upstanding member 7 at its free end. The upstanding members 6 and 7 each define a respective semi-circular recess such that in the closed position of the levers 2, the semicircular recess in each upstanding member 6 co-operates with the semicircular recess in the upstanding member 7 of the next adjacent lever 2 to define a circular aperture.

A longitudinally extending bar 8 mounts the pivots 3 for the levers 2 and each lever 2 has a lug 9 coupled by a pin and slot connection at a position 10 to a longitudinally extending actuator bar 11, such that longitudinal movment of the actuator bar 11, leftwardly from the position shown in FIG. 1 will move all the levers 2 about their pivots 3 to the open position shown in FIG. 2.

Each upstanding member 6 mounts a pivot pin 12 and each upstanding member 7 a pivot pin 13, the pivot pin 12 and 13 extending perpendicular to the longitudinal extent of the bar holder. Guide members 14 are each pivotally mounted on a respective pivot pin 12 and guide members 15 are each pivotally mounted on a respective pivot pin 13, for movement between an outward position indicated at A in a middle portion of FIG. 1 and an inward position indicated at B in a lefthand portion of FIG. 1. Each guide member 14 has, received and retained therein, an insert 16 which defines a semicircular recess and each guide member 15 has, received and and retained therein, an insert 17 which defines a semicircular recess, the semicircular recesses in the inserts 16 and 17 being such that when the guide members 14 and 16 are in the inward positions B, the semicircular recesses in the inserts16 and 17 which lie adjacent one another co-operate to form circular receiving means.

The inserts 16 and 17 are advantageously formed of nylon and are removably retained in the respective guide members 14 and 15 by spring clips such that they can readily be exchanged for other inserts which define semicircular recesses of a different diameter. Thus, inserts 16, 17 can be chosen to form together circular receiving means of a clearance fit around a bar 18 to be held in the bar holder.

Each of the guide members 14, 15 has a respective pin 20, 21 (FIGS. 3 and 5) projecting therefrom and engageable in a respective recess 22, 23 of respective catches 24, 25 pivotally mounted on pivot pins 26, 27 on the upstanding members 6 and 7. Torsion springs 28, 29 are mounted on the pivot pins 12, 13 respectively and have respective first arms 30, 31 which act on the respective catches 25, 26 to bias the catches toward one another and respective second arms 32, 33 which act on the respective pins 20, 21 to bias the respective guide members 14, 15 outwardly from the position B to the postion A.

Figure 3:
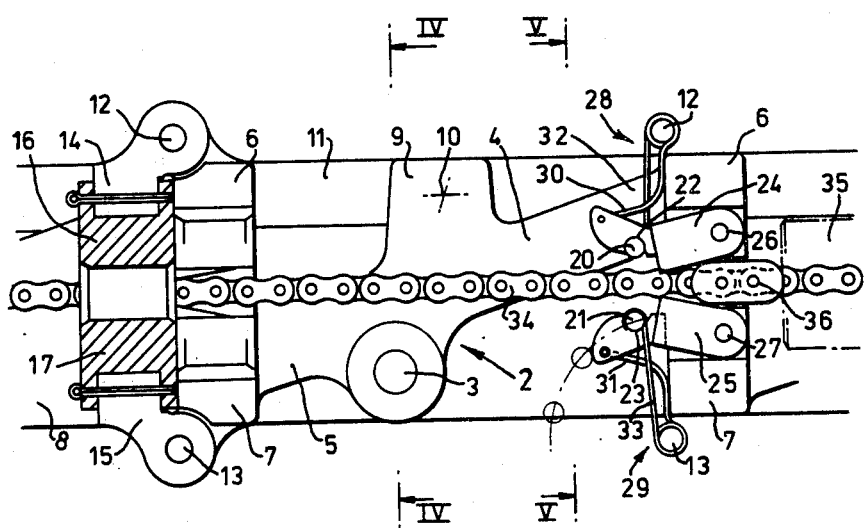
FIG. 3 is a view similar to FIG. 2 but showing operating means for opening up circular receiving means of the bar holder arrangement to permit passage therebetween of a bar feed member.

A feed chain 34 is movable leftwardly, as viewed in FIG. 3, by manual or powered means to feed a bar feed slug 35 (FIG. 1)leftwardly, by means of a tongue (not shown) but secured to the chain and engaging the rear end of the slug 35, the front end of the feed slug 35 abutting the rear end of the bar 18 to feed the bar through the bar holder arrangement to a machine tool at the front end of the bar holder, that is to say the lefthand end as viewed in FIG. 1. The feed slug 35 is of a diameter smaller than the diameters of the circular apertures defined by the semicircular recesses in the upstanding members 6 and 7 but of a greater diameter than the diameter defined by the semicircular recesses in the inserts 16, 17 of the guide members 14, 15.

A lug 36 (FIG. 3) is secured on the feed chain 34 and co-operates with the catches 24, 25 to press the catches 24, 25 apart when the lug 36 passes therebetween. The lug 36 is so positioned on the chain 34 that it is always at a position immediately in front of the front end of the slug 35. Thus, when the bar 18 lies in the circular receiving means of the inserts 16, 17 the guide members 14, 15 are in the inward position B but just before the front end of the slug 35 reaches each successive pair of guide members 14, 15, the lug 36 on the chains 34 presses the catches 24, 25 of that pair of guide members 14, 15 apart to release the pins 20, 21 from the recesses 22, 23 of the catches 24, 25 and allow the springs 28, 29 to move the guide members 14, 15 to the outward position A, so that the slug 35 can pass between that pair of guide members 14, 15. The pairs of guide members 14, 15 are thus moved outwardly successively as the slug 35 progresses leftwardly along the bar holder to feed the bar 18 to the machine tool.

Figure 6:
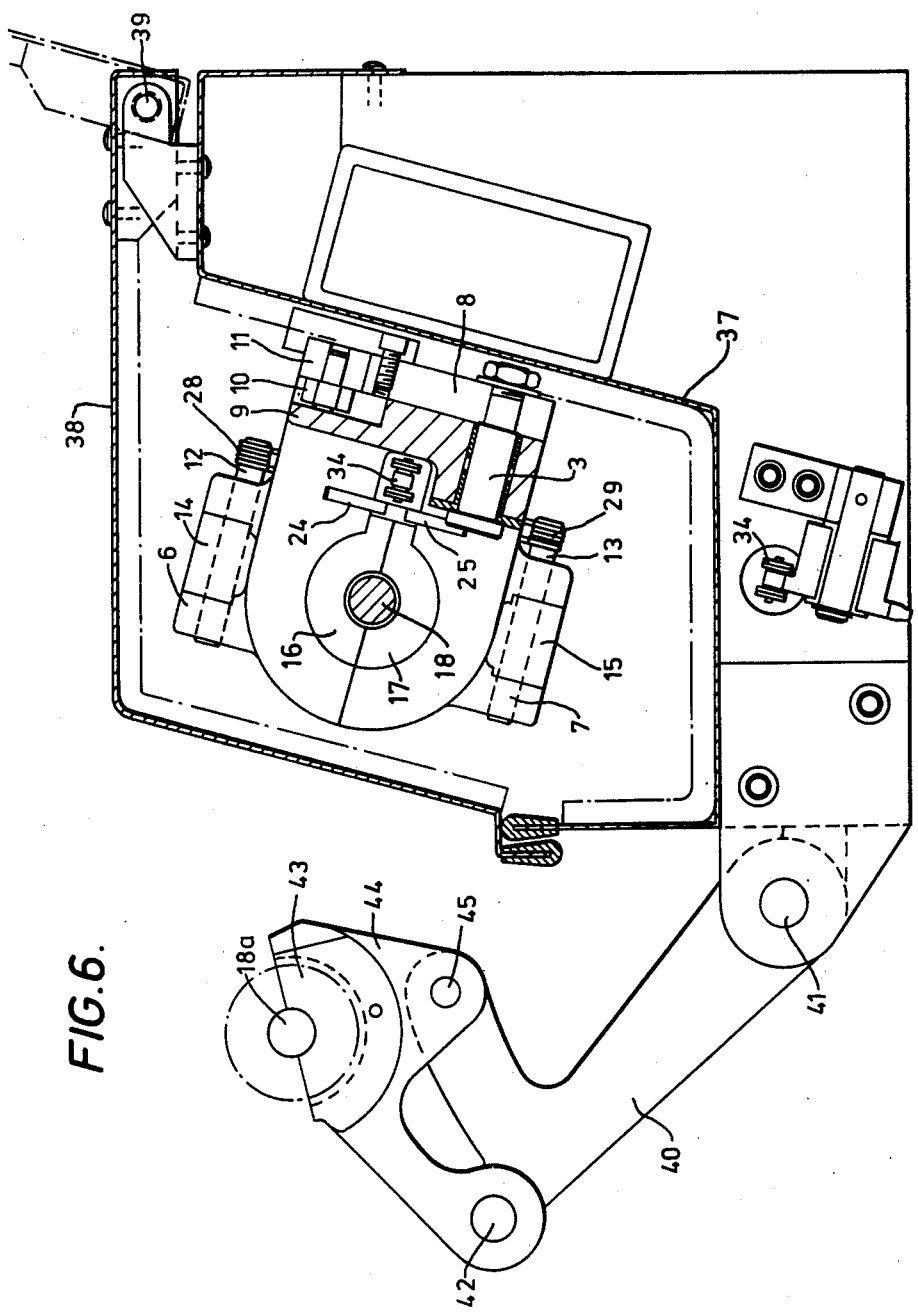
FIG. 6 is a sectional view through a bar holder arrangement according to the invention including a bar loading arrangement.

FIG. 6 shows that the bar holder is preferably orientated so that the pivot pins 12, 13 are angled slightly to the horizontal and the bar holder is encased by a fixed lower cover 37 and an upper cover 38 which is pivotable about a hinge 39 to an open position, part of which is shown in dotted lines. Arms 40, spaced along the bar holder, are pivotally mounted about a pivot bar 41. The arms 40 are so positioned and proportioned that a further length of bar stock material 18a, received in inserts 43 in further arms 44 pivotally mounted to the free end of the arms 40 by pivots 45 and connected by a handle bar 42, can be swung in from the outward position shown to the position at which the bar 18 is shown, such that the bar 18a will be centered in the circular receiving means of the co-operating inserts 16, 17 when the levers 2 are moved to the closed position. A stop bar 46 (FIG. 4) is provided to set the inner position to which the arms 40 can swing. Once the levers 2 have been moved to the closed position, the handle bar 42 can be lifted to pivot the further arms 44 about the pivots 45 so that the further arms 44 pivot with respect to the arms 40 and the inserts 43 in the arms 44 can be brought out from under the bar 18a which will by then be held in the inserts 16, 17.

In operation, when a length of bar 18 has been exhausted, that is to say the whole thereof has been fed to a machine tool positioned at the lefthand end of the bar holder arrangement (as viewed in FIG. 1), the slug 35 is retracted to the righthand end of the bar holder arrangement, the levers 2 are moved to the open position to separate the upstanding members 6 and 7 and the slug 35 is lifted out. The machine operator then manually closes together the guide members 14, 15 against the force of the springs 28, 29, the guide members 14, 15 being retained in their inner positions by the pins 20, 21 thereof engaging in the recesses 22, 23 of the catches 24, 25. The further length of bar stock material 18a is then loaded into the bar holder using the arrangement 40 to 45 to FIG. 6 and the bar 18 a is manually moved longitudinally of the bar holder until the front end thereof projects from the collet of the machine tool. The slug 35, which is of a length generally corresponding to the length of the machine tool, is then laid in the bar holder arrangement behind the bar 18a. For this reason the upstanding members 6 and further upstanding members 7 at the extreme righthand end of the bar holder arrangement, for a length of the bar holder arrangement corresponding to the length of the slug 35, are not provided with guide members 14, 15. The levers 2 are then moved to their closed position by means of the actuator bar 11 and the means powering the chain 34 can then be operated to feed the bar 18a forwardly as required, the lug 36 on the chain 34 freeing the guide members 14, 15 for movement outwardly from the position B to the position A as the front end of the slug 35 approaches them so that the slug has passage therebetween.

What is claimed is:

1. A bar holder arrangement for holding bar stock material to be fed to a machine tool, said arrangement comprising:
   a. a frame,
   b. a plurality of levers each pivotably mounted on an elongated member on said frame,
   c. each of said levers having at one of its ends an upstanding member so formed as to present a semicircular recess and at the other of its ends a further upstanding member so formed as to present a semicircular recess,
   d. a plurality of guide members each being so formed as to present a semicircular recess,
   e. each of said guide members being pivotably mounted on a respective one of said upstanding members and said further upstanding members,
   f. said guide members co-operating each with another of said guide members in pairs to define a plurality of circular receiving means for bar stock material and
   g. the pivotal mounting of each of said guide members on its respective upstanding member being about a respective axis perpendicular to the longitudinal extent of the bar holder arrangement such that it is pivotable outwardly to permit passage, between the co-operating pairs of guide members, of a bar feed member having a diameter greater than the diameter defined by the circular receiving means of said pairs of guide members,
   h. said levers being so disposed along said elongated member that the guide member on said upstanding member of one lever co-operates with the guide member on said further upstanding member of the next adjacent lever to define one of said circular receiving means for bar stock material, and
   i. means for pivoting said levers to separate the upstanding member of each lever from the further upstanding member of an adjacent one of said levers to open the bar holder arrangement and enable a length of bar stock material to be moved, in a direction perpendicular to the longitudinal extent of the length of bar stock material, to a position in which it is received by said circular receiving means when said levers are moved to respective positions in which the guide member on the upstanding member of each of said levers abuts the guide member on the further upstanding member of an adjacent one of said levers to form said circular receiving means.

2. A bar holder arrangement as claimed in claim 1, wherein said circular receiving means of said guide members are provided by inserts received and retained in said semicircular recesses in said guide members each of said inserts being so formed as to present a semicircular recess.

3. A bar holder arrangement as claimed in claim 1, further comprising catches to hold said guide members in an inward position and springs to bias said guide members to an outward position, said catches being pivotably mounted and being so formed as to present recesses to receive and engage pins projecting from said guide members when said guide members are in the inward position.

4. A bar holder arrangement as claimed in claim 3, further comprising a lug mounted on a drive chain for said bar feed member to release said catches and allow said guide members to pivot outwardly, under the bias of said springs.

5. A bar holder arrangement as claimed in claim 1, wherein said bar feed member is of a size such that circular apertures formed by said semicircular recesses in said upstanding members and said semicircular recesses in said further upstanding members form guide means therefor.

6. A bar holder arrangement as claimed in claim 1, further comprising loading means to load a length of bar stock material into the bar holder arrangement and comprising pivotally mounted arms, further arms pivotally mounted on said arms and so formed as to present recesses in said further arms for receiving a length of bar stock material, said arms and said further arms being relatively so mounted and disposed that, when said upstanding members and said further upstanding members are separated, said arms can be moved about their pivot mountings to position the length of bar stock material, received in the recesses in said further arms, in a position in which it will be received by said circular receiving means when said levers are moved to the respective positions in which the guide member on said upstanding member of each of said levers abuts the guide member on said further upstanding member of an adjacent one of said levers, said further arms being movable about their pivot mountings on said arms to move the length of bar stock material out of the recesses in said further arms and to enable said further arms to be pivoted away from the length of bar stock material received in said circular receiving means of said guide members.

7. A bar holder arrangement for holding bar stock material to be fed to a machine tool, said arrangement comprising:
   a. a plurality of guide members each being so formed as to present a semicircular recess,
   b. said guide members co-operating each with another of said guide members in pairs to define a plurality of circular receiving means for bar stock material,
   c. each of said guide members being pivotably mounted about a respective axis perpendicular to the longitudinal extent of the bar holder arrangement so as to be pivotable outwardly to permit passage between the co-operating pairs of guide members of a bar feed member having a diameter greater than the diameter defined by the circular receiving means of said pairs of guide members, and
   d. catches to hold said guide members in an inward position and springs to bias said members to an outward position, e. said catches being pivotably mounted and being so formed as to present recesses to receive and engage pins projecting from said guide members when said guide members are in the inward position.

8. A bar holder arrangement as claimed in claim 7 wherein
a lug is mounted on a drive chain for said bar feed member to release said catches and allow said guide members to pivot outwardly, under the bias of said springs.

* * * * *